United States Patent [19]
Frei

[11] Patent Number: 4,982,511
[45] Date of Patent: Jan. 8, 1991

[54] PROCESS AND APPARATUS FOR KILN-DRYING MALT

[75] Inventor: Willi Frei, St. Gallen, Switzerland

[73] Assignee: Air Fröhlich Ag für Energierückgewinnung, Arbon, Switzerland

[21] Appl. No.: 350,300

[22] Filed: May 5, 1989

[30] Foreign Application Priority Data

May 9, 1988 [DE] Fed. Rep. of Germany ....... 3815845

[51] Int. Cl.$^5$ .................................................. F26B 3/08
[52] U.S. Cl. ........................................ 34/33; 34/210; 34/214; 34/185; 34/10; 34/57 A
[58] Field of Search ................. 34/57 A, 57 B, 86, 10, 34/209, 210, 214, 215, 13, 178, 33, 185

[56] References Cited

FOREIGN PATENT DOCUMENTS

| | | |
|---|---|---|
| 49369 | 2/1889 | Fed. Rep. of Germany . |
| 191148 | 10/1906 | Fed. Rep. of Germany . |
| 1254565 | 11/1967 | Fed. Rep. of Germany . |
| 3224471 | 1/1984 | Fed. Rep. of Germany . |

Primary Examiner—Henry A. Bennet
Attorney, Agent, or Firm—Shapiro and Shapiro

[57] ABSTRACT

In the process and apparatus for kiln-drying of malt, at least two zones (A and B) are provided for preliminary drying and one zone (A1) is provided for secondary drying and/or cooling of the malt. The unsaturated exhaust air from the secondary drying and/or cooling zone (A1) is admixed as return air with the intake air system, while in the preliminary drying zones (A and B) respectively different preliminary drying times are achieved by the degree of their loading with malt, the design of the floor surface and/or by adjusting the volume flow, the temperature and/or the moisture content of the intake air, so that during the secondary drying in the secondary drying zone (A1), a predrying process is always in operation in at least one predrying zone (A or B). Each individual zone (A, B and A1) is separated in operation as to air technology from the others. The floor surface of a single floor kiln-drier (12) is subdivided by partition walls (26) into three zones (A, B and A1) and the air supply is designed so that the exhaust air is extracted unmixed zone by zone. The partition walls (26) are arranged so that each zone (A, B and A1) has a charging and discharging device (14), or the zones can be rotated into the area of a common charging and discharging device (14).

22 Claims, 2 Drawing Sheets

PROCESS AND APPARATUS FOR KILN-DRYING MALT

BACKGROUND OF THE INVENTION

1. Field of the Invention and General Technological Background

The invention concerns a process for kiln-drying malt in a floor arrangement in which there are at least two zones for preliminary drying and a zone for secondary drying and/or cooling the malt, and the unsaturated exhaust air from the secondary drying and/or cooling zone is mixed with the incoming air system as return air. The invention also relates to an apparatus for the implementation of this process with a floor arrangement, a charging and discharging device for the malt and a preliminary drying air supply and a secondary drying air supply.

In the process of drying, the so-called kiln-drying of malt, which is used for brewing, it is of great importance not only to achieve a deliberate drying of the green malt, but in addition to influence, by means of a defined temperature control of the drying air, certain malt properties which codetermine the quality and the taste of the end product in the later brewing process. Apart from these technological requirements, economic parameters must also be considered, so that the kiln-drying process proceeds as practically as possible both from the point of view of energy consumption as well as operating costs. In addition, the integration of energy-saving components in optimal fashion is especially desirable.

Today the foregoing considerations are accommodated, in accordance with the individual judgement of the economic and technological background conditions made by the individual malt enterprises, through the use of different kiln-drying systems. The most widely used are single floor and double floor kiln-drying systems, which have been used for decades past, have been constantly improved, and thereby have reached a high development state. Apart from these purely static installations from the point of view of the goods being dried, in the years of high energy prices dynamic systems were also developed using continuous malt conveyance. These three types of kiln-drying require no further explanation, because they are described in detail in the specialist literature, for example "Die Technology der Malzbereitung" by the authors Schuster/Winfurther/Narziss as well as in patents, for example DE NO. 32 24 471.1-09.

The characteristics of these kiln-drying installations can be summarized as follows:

2. Single floor kiln-drying

Single floor kiln-dryers have been built for about 40 years. These simply constructed kiln-dryers have achieved the widest distribution all over the world. On the one hand, they are advantageous with respect to investment and operation, while on the other hand they achieve relatively high specific heat consumption values of about 3 800 MJ/t finished malt (FM) without waste heat recovery (WHR) or 2 500 MJ/t FM with WHR.

3. Double floor kiln-drying

Double floor kiln-driers have been known since about the turn of the century. At that time they were still associated with high operating costs. Later they were increasingly replaced by single floor kiln-driers with the exception of the North American continent. Because of the more favorable exploitation of heating energy, this type of kiln-drying was increasingly re-adopted during periods of rising energy prices. This arrangement is at present most widely employed in new construction, although it is relatively expensive because of the use of two floors with separate charging and discharging devices as well as the costly kiln-drying air involved.

The double floor kiln-driers are usually operated in 24-hour shifts, on each day at about the same time, the entire quantity of green malt to be kiln-dried is loaded on one floor, while on the other floor the predried malt is already available from the previous day for the finishing stage of drying. Thereby a charge is kiln-dried in $2 \times 24 = 48$ hours' cycle. This presumes that each floor can accept a full quantity of green malt. One of the more advantageous variants in investment terms is the use of 12-hour shifts. With this scheme, half of the green malt quantity is loaded onto one floor in the morning, and 12 hours later, the other half is loaded onto the other floor. It is true that as a result two floors still have to be installed, but the total surface of the two floors is only as large as the surface of the single floor kiln-drier. The requirement of a two-shift operation with 10–12 hours interval between the shifts is itself a disadvantage, however.

These disadvantages as regards higher investments or increased operating expenditure are compensated by the more favorable heat consumption values. Without waste heat recovery, a specific consumption of approximately 3 000 MJ-t FM can be expected, and with waste heat recovery about 2 100 MJ/t FM.

As a result of the practically constant exhaust air states with more or less continuous modus operandi, the double floor kiln-drier is also suitable for equipment with energy saving components, such as heat pumps and/or block heating/power stations.

4. Continuous kiln-drying

Continuous kiln-driers have also been developed for optimal use of energy. The systems operate on the principle of supplying green malt continuously from a ventilated interim container to the kiln-drying installation and drying the malt in small batches in a short time. Because of the continuous operation and the small quantities of malt in the actual kiln-drying process, ideal conditions are provided for implementing modern energy concepts.

Continuously operating kiln-driers are in use as demonstration installations and have still to be optimized with respect to the control of the operating states when using continuously functioning malt conveyors. These installations, by comparison with a double floor kiln-drier, are significantly more compact in construction. Regarding energy consumption, both types operate within the same general range, above all when in the case of double floor kiln-drying, the time and energy consuming reloading of the malt from the preliminary drying phase is omitted.

5. Technical principles for use of air in the kiln-drying process

The different consumption values in the drying of malt are caused by the fact that the drying process is sub-divided, for technological reasons, into two phases which differ substantially due to different incoming air temperatures. Green malt for brewing purposes arrives on the kiln-drier with a water content of 40-50% and should be dried in the first phase, so-called preliminary drying, under protective conditions at temperatures around 60° C. to a water content of 12%. In this phase, the grain surface of the malt remains moist, so that the kiln-dried air leaves the malt bed practically steam saturated. This period, depending on the type of kiln-drier, can last from 10 to 24 hours and is distinguished by optimal utilization of the drying potential of the kiln-drying air.

In the second phase, so-called secondary drying, a water content in the finished malt of less than 5% is to be achieved, while during the last hours, again for technological reasons, the kiln-drying air should be between 80° to 90° C., in many cases up to 110° C.

The insufficient utilization of the drying potential which results is indicated by a marked increase in the temperature of the kiln-drying air consumed. In fact, if the exhaust air temperature at the end of the preliminary drying time is still about 28°C., it increases by the end of the secondary drying phase to values between 70° and 80°C.

At the time of introduction of the single floor kiln-drier, the loss of energy which was associated with the operation of the secondary drying phase was accepted, because the energy factor at that time was only a subordinate concern in the production of malt. However, there was soon a change to the use of circulating air channels with valves in these single floors kiln-driers, in order to mix a part of the exhaust air with the intake air flow as the secondary drying period progressed. The residual exhaust air flow, as in the past, left the kiln-drier at high temperatures. Notably, even the use of heat exchanger installations could never completely compensate for the loss, while the energy liberated during the cooling of the malt batch to ambient temperature was lost in any case.

With increasing costs for heating energy, there was renewed interest the double floor kiln-drier in which the two drying phases do not take place consecutively as in single floor kiln-drying, but simultaneously. In the ideal case as regards heat technology, the preliminary drying period overlaps the secondary drying and cooling periods, which are energy inefficient, so that the exhaust air from the secondary drying floor can be fed back in full volume as recirculated air to the air intake side. Thereby, in practice, only exhaust air saturated with water vapor arrives from the preliminary drying floor, which in addition provides good conditions for use of various waste heat recovery systems.

6. Disclosure of the Invention

The present invention provides a process, and an apparatus for the implementation thereof, in which the simple arrangement of a single floor kiln-drier is combined with the energy-optimal operation of the double floor kiln-drier.

This object is achieved according to the technique of the invention in that in at least two preliminary drying zones, respectively different preliminary drying times are achieved by the degree of charging with malt, the design of the floor surface and/or by the adjustment of the volume flow, the temperature and/or the moisture content of the intake air. Thus, during the secondary drying in a secondary drying zone, a preliminary drying process can always be carried out in at least one preliminary drying zone. Each individual zone is separated from the others as to operation of the ventilation. In the apparatus according to the invention, the floor surface of a single floor kiln-drier is subdivided by partition walls into at least three zones and the air supply is arranged in such a way that the exhaust air is extracted zone by zone without being mixed. Furthermore, the partition walls are designed so that each zone has a charging and discharging device or can move into the area of a common charging and discharging device.

The operation of this so-called combination kiln-drier proceeds such that the daily incoming amount of green malt is subdivided within a normal working shift for the free zones, and by suitable measures in charging, subdivision of the floor surface and kiln-drying air supply, a preliminary drying time which is different for each zone is effected. For technological reasons, the shortest predrying time in a zone should be at least 8 hours, the longest should amount to a maximum of 24 hours.

The zones are provided with partition walls which, depending on the form of the floor, are either fixed or are arranged to be partially movable together with the floor, so that each individual zone is separate from the others with respect to the ventilation and so that the exhaust air can be extracted unmixed, by zone via an air valve system. Thus the possibility also arises that unsaturated exhaust air from the secondary drying and/or cooling zone can be admixed as return air with the intake air system and that moist, saturated exhaust air from each preliminary drying air zone or zones may be extracted unmixed and fed to a waste heat recovery installation. In the preferred application, which makes use of a waste heat recovery installation, this has the advantage that the energy consumption can be more favorable.

When using a fixed single floor kiln-drier it is a particular advantage in the process according to the invention that the floor is subdivided into three separate zones, i.e. a secondary drying zone and two preliminary drying zones. In the first zone, there is a partial amount of green malt which was predried on the previous day and in this zone the secondary drying process is initiated. The other two zones are charged with different quantities of green malt, and the preliminary drying process is operated in these two zones. In this modus operandi, it is preferable to terminate the predrying time of one zone after 16 hours and of the other zone after 24 hours, and for the green malt subsequently to be subjected to the secondary drying in the same zone for from 8 to 16 hours, and then cooled. Thereby a given charge of green malt always remains in the same zone, in which the supply firstly with preliminary drying air, and then with secondary drying air, is carried out by automatic temperature control via an air valve system. Thus, at least one zone is always in the predrying phase throughout the entire 24 hour cycle.

In the case of conventional single floor kiln-drying, the predrying time normally lasts for 12 hours, so that there is enough time left for secondary drying, cooling, charging and discharging. In the combination kiln-drier of the present invention, the accumulated predrying time, based on the total amount of green malt is 24 hours, i.e. the average predrying air quantity is only 50% as great as in the case of single floor kiln-drying. Because of the exponential behaviour of the flow consumption with reduced throughput of air, the effective floor surface for predrying can be significantly smaller in the case of the present combination kiln-drier. As a result, when taking into consideration the additional secondary drying floor area for the charge from the previous day, the total floor area can be within the limits of a single floor kiln-drier. However, heat exchangers, heating and the feed volumes of the kiln-drying ventilators can be designed to be substantially smaller, so that the investment costs are similar to the single floor kiln-drier, but the energy consumption moves within the range for an optimally designed double floor kiln-drier.

In the case of a further inventive process variant, a circular single floor kiln-drier is used. This kiln-drier a fixed air supply and the floor is designed to be rotatable. The floor surface is divided into three separate zones, namely a charging, discharging and pre-preliminary drying zone, a preliminary drying zone and a secondary drying and cooling zone. The zone concerned can be connected by rotating the floor to connect the zone with the desired air supply. This results in a simple structure of the arrangement with a minimum of moving parts. By contrast with the embodiment using a fixed floor, the rotating floor moves the individual quantities of green malt from one treatment zone to another by rotating through 120°, so that the changeover of exhaust air by valves is unnecessary. The air system for each zone need only be designed either for predrying or for secondary drying/cooling, and only one charging/discharging device is necessary.

Advantageous embodiments of apparatus for the implementation of the inventive process are described in claims 9 to 16.

BRIEF DESCRIPTION OF THE DRAWINGS

The invention will be described in more detail below on the basis of embodiments which are shown in the accompanying drawings, including.

DESCRIPTION OF PREFERRED EMBODIMENTS

Figure 1:
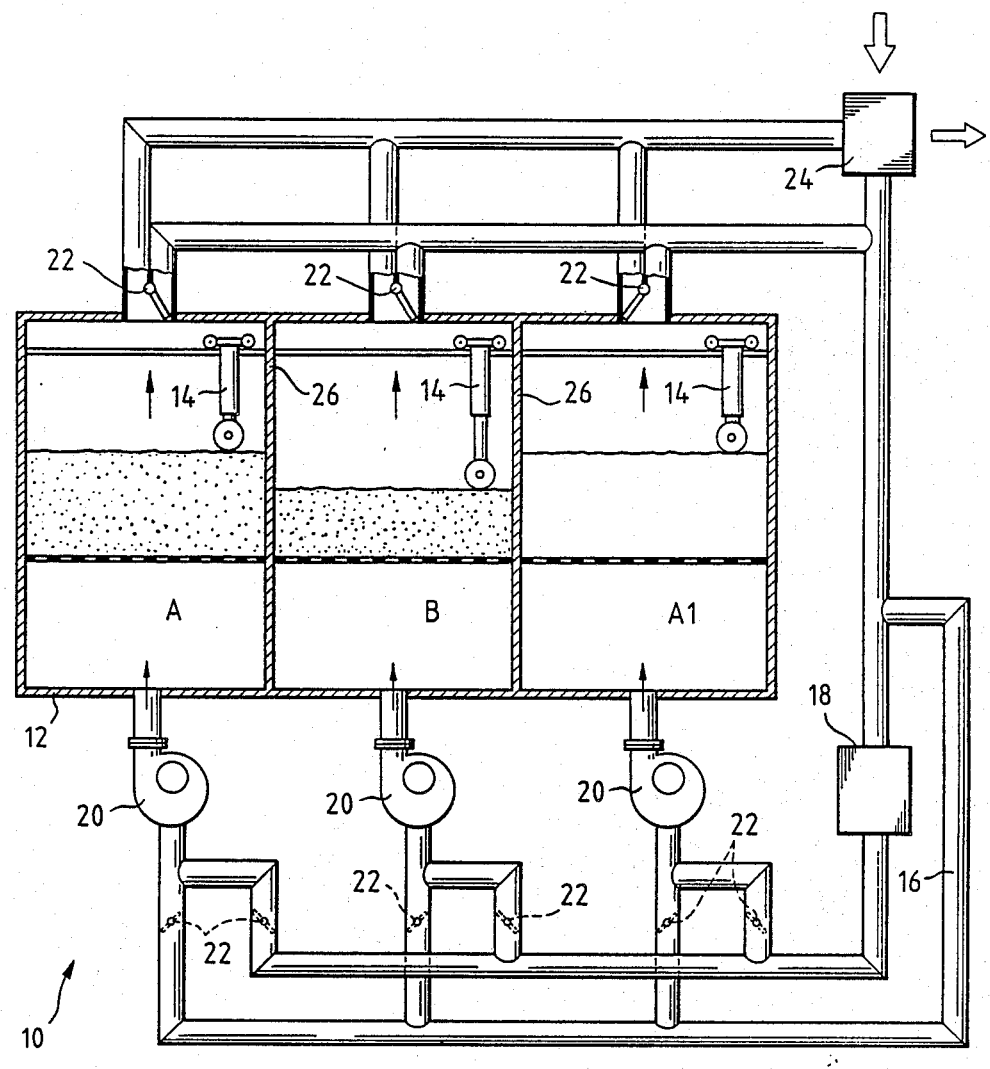
FIG. 1 a schematic illustration of a vertical section through a first embodiment of the inventive apparatus equipped with a fixed floor, and FIG. 2 a schematic illustration of a horizontal section through a second embodiment of the inventive apparatus with a rotating floor.

In FIG. 1, for example, a three-zone fixed-floor combination kiln-drier is shown. The kiln-drier 10 includes of a three-part drying floor 12 having a charging and discharging device 14 arranged in each zone A, B and A1 as well as a kiln-drier air supply with temperature control. The three zones A, B and A1 of the surface of the floor 12 are divided by partition walls 26. A system of air valves 22 is arranged in the intake and exhaust air system of the kiln-drier 10, in which by automatic temperature control the air supply is provided to the respective zones via the air valves. The generation and/or conveyance of the preliminary drying air and/or of the secondary drying air is carried out by mixing air from a bypass channel 16 with hot air from a secondary drying air heater 18 via ventilators 20 which are arranged in the intake air system. To reduce the energy loss, a waste heat recovery installation 24 is arranged in the exhaust air system of the kiln-drier 10.

The operation for three-zone system of FIG. 1 may proceed as follows. Two of the three zones—for example, zones A and B—are charged with green malt while, in the third zone—for example, zone A1—, a predried amount of green malt is present from the previous day and is already at the beginning of the secondary drying phase. The charging begins with zone B (approximately 40%) and the rest of the day's supply is then distributed on zone A. These two zones are supplied with preliminary drying air. The dimensioning of the kiln-drier 10 and the charging heights are such that the preliminary drying in zone B is completed after about 16 hours and in zone A after about 24 hours. Each zone is then subjected to secondary drying for from 8 to 16 hours and is then cooled. Each charged of green malt always remains in the same zone. Thus one zone is in the preliminary drying phase throughout the entire 24 hour cycle, while exhaust air from this zone is utilized in the waste heat recovery installation and exhaust air from the zone in the secondary drying or cooling phase is utilized in the intake air system.

Figure 2:
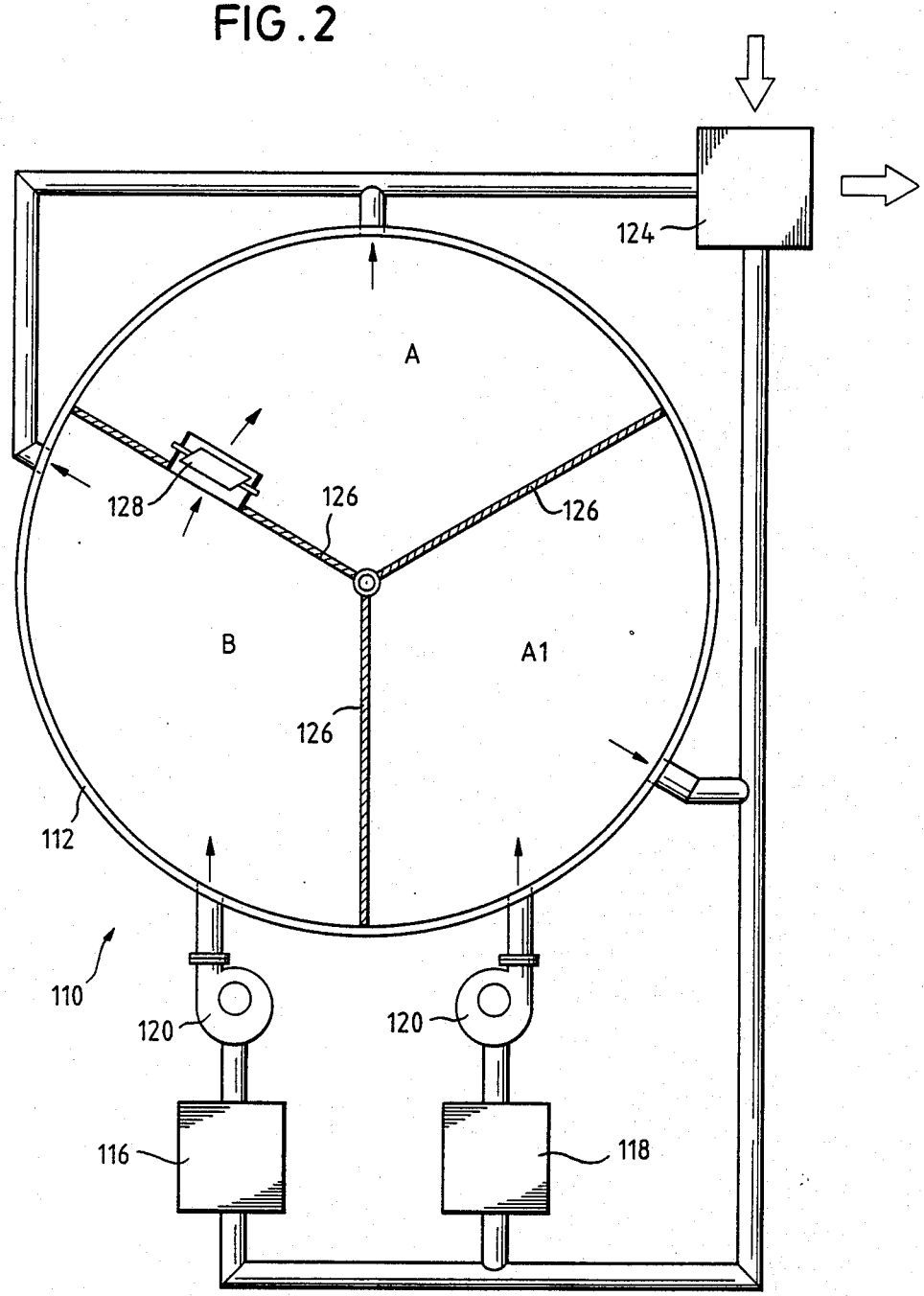

The three-zone combination kiln-drier shown in FIG. 2 is a variation having a rotating floor 112. This kiln-drier 110, like the combination drier shown in FIG. 1, has a floor surface which is subdivided into three zones A, B and A1 with partition walls 126. It comprises a charging and discharging device (not shown) allocated to zone A, which constitutes a the charging, discharging and pre-preliminary drying zone, a kiln-drier air supply with temperature control and a secondary drying air supply. The air supply is fixed and the conveyance of the preliminary and secondary drying air is carried out from the preliminary and secondary drying air heaters 116, 118 via ventilators 120 which are arranged in the intake system. A waste heat recovery installation 124 is arranged in the exhaust air system of the air supply. Between the charging, discharging and pre-preliminary drying zone A and the preliminary drying zone B, an air valve 128 which can be closed to be air-tight is arranged under the rotatable floor 112. This air valve 128 does not have a control function, but only an open and closed function, and is used to supply zone A with predrying air when in the open position. The rotatable floor 112 is arranged in the kiln-drier 110 so that it is suitable for automatic change of zones.

A practical operation of the rotating floor with the three zones A, B and A1 will now be described.

At the start of work in the morning, an approximately 60% charge is located in the predrying zone B from the previous day at the end of the predrying phase, while in the secondary drying and cooling zone A1, an approximately 40% charge from the previous day is already cooled. While the predrying zone B and the secondary drying and cooling zone A1 are still in operation, the empty charging, discharging and pre-preliminary drying zone A is charged with about 40% of the incoming green malt. The air valve 128 under the rotating floor 112 is closed between zone A and zone B. After the end of the charging process in zone A and conclusion of the cooling process in zone A1, the rotating floor 112 is rotated through 120°. Thus, the cooled charge comes to rest in the charging, discharging and pre-preliminary drying zone A, and the new 40% charge comes to rest in the preliminary drying zone B. During the rotating process of the rotary floor 112, the predrying ventilator 120 remains in operation, whereas the secondary drying ventilator 120 is switched off after cooling.

In the secondary drying and cooling zone A1, there is now the 60% charge from the previous day, and the secondary drying ventilator 120 and the secondary drying air heater 118 start operation. In zone A the finished charge of malt is removed and immediately thereafter the residual approximately 60% of the new green malt is charged. The air valve 128 is opened between zone A and B and because of the different charges, about 45% of the predrying air quantity conveyed by the ventilator 120 flows through zone A and about 55% thereof through zone B. After about 14 hours, the secondary drying and cooling process in zone A1 is terminated and at about the same time, the predrying operation in zone B is concluded. The air valve 128 between zone A and B is closed and the rotating floor 112 is again rotated through 120°.

In the preliminary drying zone B, there is now the 60% charge for further preliminary drying, but with a higher preliminary drying air quantity, because only this zone B is still supplied with air. In the secondary drying and cooling zone A1, there is now the 40% charge, and in the charging, discharging and pre-preliminary drying zone A the 60% charge from the previous day is removed. Until the recommencement of the cycle on the following morning, zone A remains empty. The cycle begins again on the following morning when the secondary drying and cooling zone A1 is completely dried out and is being cooled with the charging of zone A.

What we claim is:

1. A process for the drying of malt in a kiln-drier, in which
   (a) there are provided at least two zones for preliminary drying and one zone for secondary drying of the malt and
   (b) unsaturated exhaust air from the secondary drying zone is admixed as return air with intake air for preliminary drying,
   wherein
   (c) in the preliminary drying zones respectively different preliminary drying times are employed, and during the secondary drying in the secondary drying zone, a preliminary drying process always takes place in at least one preliminary drying zone, and
   (d) each individual zone is separate as to ventilation from the other zones.

2. A process as in claim 1, wherein
   the shortest preliminary drying time amounts to at least 8 hours, and the longest to maximally 24 hours.

3. A process as in claim 1, wherein
   moist, saturated exhaust air from the preliminary drying zone or zones is lead directly in to a waste heat recovery installation.

4. A process as in claim 1, wherein
   the kiln-drier is a fixed single floor kiln-drier subdivided into three separate fixed zones, a first one of which is used in the secondary drying phase while one or both of the second and third zones are used in the preliminary drying phase.

5. A process as in claim 4, conducted in a 24-hour operating cycle, and wherein, at the beginning of a given operating cycle,
   (a) the first zone contains a completely preliminary dried amount of green malt from the previous operating cycle for secondary drying, and
   (b) the two other zones are charged with different amounts of green malt for preliminary drying.

6. A process as in claim 5, wherein
   (a) the preliminary drying time in the second zone is ended after 16 hours and in the third zone after 24 hours, and
   (b) the completely preliminary dried amounts of green malt of said second and third zones are, in turn, subjected to secondary drying for 8 to 16 hours in their respective zones.

7. A process as in claim 1, wherein
   (a) the kiln-drying is performed in a circular single-rotatable-floor kiln-drier subdivided into three separate zones rotatable with the floor,
   (b) the floor is rotatable through three rotational positions in which one of the zones is connected to a first fixed air supply for operation as a charging, discharging and pre-preliminary drying zone, another of the zones is connected to a second fixed air supply for operation as a preliminary drying zone and another of the zones is connected to a third fixed air supply for operation as a secondary drying and cooling zone, and
   (c) the floor is rotated such that each zone operates successively as the charging, discharging and pre-preliminary drying zone, the preliminary drying zone, and the secondary drying and cooling zone.

8. A process as in claim 7, conducted in a 24-hour operating cycle and wherein
   (a) at the beginning of a given operating cycle a first green malt charge from the previous cycle is in the preliminary drying zone having completed the preliminary drying phase and a second green malt charge from the previous cycle is in the secondary drying and cooling zone in the cooling phase, and the charging, discharging and pre-preliminary drying zone is charged with a first new charge of newly incoming green malt,
   (b) after the end of the charging process in the charging, discharging and pre-preliminary drying zone and after termination of the cooling phase in the secondary drying and cooling zone, the floor is rotated through 120°, so that the cooled second charge from the previous cycle is moved into the charging, discharging and pre-preliminary drying zone, the preliminary-dried first charge from the previous cycle is moved into the secondary drying and cooling zone and the first new charge is moved into the preliminary drying zone, with the preliminary drying air supply remaining in operation during rotation of the floor and the secondary drying air supply being switched off after termination of the cooling phase,
   (c) after stopping of the floor, the secondary drying air supply is restarted and in the charging, discharging and pre-preliminary zone the second charge from the previous cycle is removed and replaced with a second new charge of the newly incoming green malt,
   (d) unequal quantities of preliminary drying air are supplied to the preliminary drying zone and the charging, discharging and pre-preliminary drying zone due to the different charges of the two zones,
   (e) the secondary drying and cooling phase in the secondary drying and cooling zone and the preliminary drying phase in the preliminary drying zone are completed approximately simultaneously, whereupon the floor is again rotated through 120° and the supply of preliminary drying air to the charging, discharging and pre-preliminary drying zone is concluded, and
   (f) after the last-mentioned rotation of the floor, the first new charge is located in the secondary drying and cooling zone and subjected to the secondary drying phase, while in the charging, discharging and pre-preliminary drying zone, the first charge from the previous cycle is removed and the second new charge located in the preliminary drying zone is subjected to the preliminary drying phase with a higher preliminary drying air quantity, the emptied charging, discharging and pre-preliminary drying zone remaining empty until the start of the next operating cycle.

9. An apparatus for drying malt, comprising a kiln-drier having
(a) a single drying floor,
(b) means for charging and discharging malt to and from the drying floor and
(c) means for supplying preliminary drying air and secondary drying air to the drying floor, wherein
(d) the floor is subdivided by partition walls into at least three zones,
(e) the air supplying means supplies and removes drying air separately to and from each zone, and
(f) the charging and discharging means charges and discharges malt to and from each zone individually.

10. An apparatus as in claim 9, wherein
a waste heat recovery installation is provided in an exhaust air system of the air supplying means.

11. An apparatus as in claim 9, wherein
the air supplying means is provided with air valve means for controlling flow of supply and exhaust air to and from the zones.

12. An apparatus as in claim 11, wherein
the air valve means is designed so that each zone may selectively be supplied with secondary drying air while one or both of the remaining zones is supplied with preliminary drying air.

13. An apparatus as in claim 12, wherein
the air valve means is automatically activated.

14. An apparatus as in claim 9, wherein
(a) the floor is fixed and
(b) said air supplying means includes a separate intake and exhaust air installation for each zone.

15. An apparatus as in claim 9, wherein
(a) the floor is rotatable, and
(b) said air supplying means includes three fixed air intake and exhaust arrangements to which the zones can be connected selectively by rotation of the floor, whereby each zone may be operated selectively as a charging, discharging and pre-preliminary drying zone, as a preliminary drying zone, and as a secondary drying and cooling zone.

16. An apparatus as in claim 15, wherein
between the charging, discharging and pre-preliminary drying zone and the preliminary drying zone, an air valve which can be closed to be air-tight is provided.

17. A process for kiln-drying malt in which green malt is preliminary dried with ventilation under first drying conditions and then secondary dried with ventilation under different drying conditions, and comprising:

(a) providing a kiln-drier subdivided into at least three separately ventilated drying zones,
(b) at the beginning portion of a given operating cycle of predetermined duration, charging a first of said zones with a first fraction of a charge of newly incoming malt to be treated during said given cycle and charging a second of said zones with a second fraction of said charge, the third of said zones containing a fully preliminary-dried fraction of a charge of malt from a preceding operating cycle,
(c) during a first drying phase of said given operating cycle, simultaneously secondary drying said charge fraction from the preceding operating cycle to completion, preliminary drying said first charge fraction to completion, and partially preliminary drying said second charge fraction,
(d) during a second drying phase of said given operating cycle, simultaneously secondary drying said first charge fraction to completion and further preliminary drying said second charge fraction,
(e) during both of said first and second drying phases, admixing unsaturated exhaust air from the secondary drying phase with intake air being used for preliminary drying, and
(f) repeating the aforesaid steps for successive operating cycles.

18. A process as in claim 17, wherein
the second charge fraction is preliminary-dried to completion in the second drying phase of said given operating cycle, and is then carried over for secondary drying in said first drying phase of the next operating cycle.

19. A process as in claim 18, wherein
the duration of said first drying phase is about 16 hours and the duration of said second drying phase is about 8 hours.

20. A process as in claim 18, wherein
the kiln-drier has a fixed single floor subdivided into three sections, each fixed in one of said zones.

21. A process as in claim 18, wherein
the kiln-drier is a single-rotatable-floor kiln-drier divided into three zones rotatable with the floor, the floor being rotatable through three rotational positions in which one of the zones is connected to a first fixed air supply for operation as a charging, discharging and pre-preliminary drying zone, another of the zones is connected to a second fixed air supply for operation as a preliminary drying zone and another of the zones is connected to a third fixed air supply for operation as a secondary drying zone, and
the floor is rotated such that each zone operates successively as the charging, discharging and pre-preliminary drying zone, the preliminary drying zone, and the secondary drying and cooling zone.

22. A process as in claim 18, wherein
the duration of the first phase is approximately twice the duration of the second phase.

* * * * *